United States Patent [19]

Iwai et al.

[11] 4,327,062
[45] Apr. 27, 1982

[54] PROCESS FOR PRODUCING CHLORIDE OF ELEMENTS OF GROUP III, IV OR V OF PERIODIC TABLE

[75] Inventors: Tadashi Iwai; Hisayuki Mizuno; Masao Miura, all of Ube, Japan

[73] Assignee: UBE Industries, Ltd., Yamaguchi, Japan

[21] Appl. No.: 231,462

[22] Filed: Feb. 4, 1981

[30] Foreign Application Priority Data

Feb. 13, 1980 [JP] Japan ................................. 55-15493
Jul. 15, 1980 [JP] Japan ................................. 55-95692

[51] Int. Cl.$^3$ ............................................. C01B 9/02
[52] U.S. Cl. ..................................... 423/292; 423/79; 423/341; 423/492; 75/112
[58] Field of Search .............. 423/60, 76, 79, 136, 423/292, 341, 343, 491, 92, 96; 75/112, 113

[56] References Cited

U.S. PATENT DOCUMENTS 1,519,470 12/1924 Wilson et al. .................. 252/447
2,479,904 8/1949 Cole ................................. 423/79 X
2,770,529 11/1956 Anderson et al. .............. 423/492 X
3,095,271 6/1963 McIntyre et al. .................. 423/292
3,130,168 4/1964 Hov et al. ...................... 423/292 X
3,197,283 7/1965 Hammer ........................... 423/343
4,244,935 1/1981 Dell ................................ 423/496 X

FOREIGN PATENT DOCUMENTS 643394 6/1962 Canada ............................. 423/292

Primary Examiner—G. O. Peters
Attorney, Agent, or Firm—Burgess, Ryan and Wayne

[57] ABSTRACT

The chlorides of elements of Groups III, IV and V of the Periodic Table, such as, boron trichloride, silicon tetrachloride, zirconium tetrachloride and vanadium tetrachloride are prepared by heating activated carbon particles having a supported aqueous solution of compounds of the elements of Groups III, IV and V of the Periodic Table thereon at a temperature of from 300° through 1000° C. and, then, reacting the resultant activated carbon particles with chlorine.

18 Claims, No Drawings

PROCESS FOR PRODUCING CHLORIDE OF ELEMENTS OF GROUP III, IV OR V OF PERIODIC TABLE

The present invention relates to the improvement in a process for producing the chlorides of elements of Group III, IV or V of the Periodic Table, such as, boron trichloride, silicon tetrachloride, zirconium tetrachloride and vanadium tetrachloride.

The chlorides of elements of Group III, IV or V of the Periodic Table are useful as, for example, starting materials in various fields. For instance, boron trichloride is useful as a starting material in the production of, for example, boron nitride, lanthanum boride and catalysts for cationic polymerization; silicon tetrachloride is useful as a starting material in the production of, for example, finely divided silica, high purity synthetic quartz, silicon carbide, silicon nitride and various organic silicon compounds; zirconium tetrachloride is useful as a starting material in the production of, for example, finely divided zirconia, zirconium nitride, zirconium carbide and zirconium sponge; and vanadium tetrachloride is useful as a starting material in the production of, for example, vanadium metal and oxidation catalysts.

Various processes for producing the chlorides of elements of Group III, IV or V of the Periodic Table are heretofore known in the art.

For instance, conventional typical processes for producing boron trichloride are:

(1) an intimate mixture of finely divided diboron trioxide ($B_2O_3$) and carbon (C) is subjected to a sintering heat-treatment at a temperature of from 1200° to 1300° C. to form a porous aggregate and, then, after crushing the resultant porous aggregate into sized fragments, the sized fragments are reacted with chlorine gas at a temperature of from 1000° to 1200° C. (see U.S. Pat. No. 2,369,212); and (2) chlorine gas is passed through a mixture of carbon and an oxygen-containing boron compound (e.g. diboron trioxide) in the proportion by weight of the oxygen-containing boron compound to the carbon of from 0.6 to 1.5, whereby the mixture is reacted with chlorine at a temperature of from 400° to 700° C. (see U.S. Pat. No. 2,097,482)

However, there are the following disadvantages in the above-mentioned process (1).

(a) The intimate mixing of the finely divided diboron trioxide and carbon is difficult due to the facts that the physical properties and specific gravity of the diboron trioxide and carbon are different.

(b) Even though the intimate mixing of the finely divided diboron trioxide and carbon can be performed, porous and homogeneous aggregates of the mixture cannot be readily obtained and the chlorination reaction cannot smoothly proceed due to the fact that the diboron trioxide is molten and liquefied during the heat-treatment at a temperature of from 1200° to 1300° C., whereby the diboron trioxide and the carbon separate into two layers.

(c) Since this process requires the heating to a high temperature more than 1000° C. twice and also since the corrosive action of chlorine is strengthened, in the presence of volatile boron compounds in the reaction atmosphere at the above-mentioned high temperature, so that not only metals but also glass is corroded, there is a problem in the selection of materials for the reaction apparatus. In addition, according to this process, the sintered porous aggregate should be crushed into the sized fragments, which operation is very troublesome.

There are also the following disadvantages in the above-mentioned process (2), although the reaction temperature is from 400° to 700° C., which is lower than the reaction temperature of the process (1).

(a) The intimate mixing of diboron trioxide and carbon is difficult as in the case of the above-mentioned process (1).

(b) Even though the intimate mixing of the diboron trioxide and carbon can be performed, the carbon powder tends to scatter, when the chlorine gas is allowed to pass through the mixture, and the diboron trioxide is molten and liquefied during the reaction and the molten diboron trioxide accumulates in the bottom of a reaction tube due to the difference in the specific gravity of the molten diboron trioxide and the carbon powder. Thus, since the flow and distribution of the chlorine gas and the uniform contact of the mixture of diboron trioxide and carbon with the chlorine gas become difficult, the desired chlorination reaction cannot smoothly proceed and also a long reaction time is required. In addition, even if the mixture of diboron trioxide and carbon powder is molded to prevent the scattering of the carbon powder, the molding of the mixture is difficult due to poor moldability, especially, in the case where activated carbon powder is used as the carbon powder. Contrary to this, although the mixture can be molded when graphite powder is used as the carbon powder, a long reaction time is required and yield of the boron trichloride is low when said molded mixture is used.

Conventional typical processes for producing silicon tetrachloride are:

(1) Silicon carbide, ferrosilicon and the like are reacted with chlorine at an elevated temperature; and (2) A mixture of silicon-containing compounds and carbon, for example, a mixture of siliceous stone and activated carbon or coked rice hulls is reacted with chlorine at an elevated temperature. However, the above-mentioned process (1) has the disadvantage that the production of the starting materials such as silicon carbide, ferrosilicon consumes a large amount of electric power and, therefore, the starting materials are very expensive.

On the other hand, the above-mentioned process (2) has the disadvantage that, in order to obtain silicon tetrachloride at a desirable yield, the chlorination reaction should be carried out at a very high temperature of more than 1200° C.

Conventional typical processes for producing zirconium tetrachloride are:

(1) A mixture of finely divided zircon sand ($ZrO_2 \cdot SiO_2$) and carbon powder is molded into a briquette after adding a binder thereto and, then, the resultant briquette is reacted with chlorine at an elevated temperature (see Japanese Laid-Open Patent Application No. 50-91592/75).

(2) A mixture of zirconium oxide and zirconium metal powder is introduced, together with carbon (i.e. a reducing agent), to a fluididized bed type chlorination furnace, wherein the mixture and the carbon are reacted with chlorine (see Japanese Laid-Open Patent Application No. 53-97997/78).

(3) Zircon sand is fused with caustic soda to form sodium zirconate and, then, after carbon powder is added to the resultant sodium zirconate, the mixture is reacted with chlorine (see Japanese Patent Publication No. 40-20369/65).

However, the above-mentioned process (1) has the disadvantages that the difficult and troublesome intimate mixing operation of the finely divided zircon sand and carbon powder is required, the binder is required and the reaction temperature with chlorine is high.

The above-mentioned process (2) also has the disadvantages that a difficult and troublesome mixing operation is required and expensive zirconsium metal should be used as a starting material.

Furthermore, the above-mentioned process (3) has the disadvantages that the preparation step of the sodium zirconate is troublesome and, further, that the sodium zirconate should be formed into particulates which, in turn, should be intimately mixed with carbon powder.

Conventional typical processes for producing vanadium tetrachloride are:
(1) Vanadium metal is reacted with chlorine; and
(2) Vanadium pentoxide powder is mixed with carbon powder, followed by reacting with chlorine.

However, the above-mentioned process (1) is not preferable from a technical point of view due to the fact that the starting vanadium metal is very expensive. On the other hand, the above-mentioned process (2) has the disadvantages that the troublesome and inefficient mixing operation of vanadium pentoxide powder and carbon powder is required and, further, in the case where the reaction is carried out in, for example, a fixed bed and a moving bed, the mixture of vanadium pentoxide powder and carbon powder, which is difficult to mold, should be molded. In addition, the yield of vanadium tetrachloride in this process is low.

Accordingly, an object of the present invention is to obviate the above-mentioned disadvantages of the prior processes for producing the chlorides of elements of Groups III, IV or V of the Periodic Table and to provide an improved process for producing the same in which (i) the production reaction can be easily carried out, without using a troublesome and inefficient mixing operation of powder, at a simple apparatus, (ii) the reaction can smoothly proceed even at a relatively low temperature and (iii) the desired chlorides having a high purity can be produced at a high yield in a short reaction time at a low temperature.

Other objects and advantages of the present invention will be apparent from the following description.

In accordance with the present invention, there is provided a process for producing the chloride of an element selected from the group consisting of Groups III, IV and V of the Periodic Table of Elements comprising the steps of:
(i) impregnating activated carbon particles with an aqueous solution of at least one compound, other than the chloride, of said element selected from the group consisting of Groups III, IV and V of the Periodic Table of Elements;
(ii) heating the activated carbon particles having a supported aqueous solution of said compound thereon at a temperature of 300° through 1000° C. under an inert gas atmosphere; and, then,
(iii) reacting the resultant activated carbon particles with chlorine.

The suitable compounds of Groups III, IV and V of the Periodic Table are those, other than chlorides, which are soluble in water, aqueous solutions of acids such as nitric acid, oxalic acid and aqueous solutions of alkalis such as ammonia, sodium carbonate and sodium hydroxide and also which can be supported, as oxides (including composite compound oxides), on activated carbon by subjecting to a heat-treatment in an inert gas atmosphere. Typical examples of such compounds are: boron compounds such as boric acid, sodium tetraborate ($Na_2B_4O_7$, $Na_2B_4O_7.10H_2O$), potassium tetraborate, ammonium hydrogen tetraborate and the like; indium compounds such as indium hydroxide, indium nitrate and the like; thallium compounds such as thallium carbonate, thallium nitrate, thallium hydroxide and the like; silicon compounds such as sodium silicate, potassium silicate and the like: zirconium compounds such as zirconium oxide nitrate [$ZrO(NO_3)_2.2H_2O$], zirconium nitrate and the like; tin compounds such as stannic acid, tin hydroxide and the like; and vanadium compounds such as ammonium metavanadate, sodium vanadate, vanadium pentoxide and the like. In addition to the above-mentioned compounds, substances containing $SiO_2$, such as, siliceous stone, silica flower, fly ash and the like can also be used in the present invention after alkali fusion with, for example, sodium hydroxide or sodium carbonate to convert silicon compounds such as sodium silicate.

According to the present invention, the above-mentioned compounds of elements of Groups III, IV and V of the Periodic Table are used as an aqueous solution after dissolving in water, an aqueous acid solution such as nitric acid, oxalic acid and the like or an aqueous alkaline solution such as sodium hydroxide, ammonia, sodium carbonate and the like. Although there is no specific limitation, the concentration of the compounds in the aqueous solution is typically from 5 to 50% by weight and, preferably, from 10 to 45% by weight.

The shape of the activated carbon particles used in the present invention can be either spherical particles, cylindrical particles or crushed particles. There is no limitation in the form of the activated carbon particles. The typical diameter of the activated carbon particles used in the present invention can be generally from 1 to 50 mm and preferably from 3 to 15 mm, although it depends on the reactor type such as a fix bed, a fluidized bed and a moving bed, the size of the reactor and the other reaction conditions. In the case where the diameter of the activated carbon particles is too small, it is not preferable that the flowability and dispersibility of chlorine gas are disturbed and that the activated carbon particles are entrained with the gaseous reaction product and that a long reaction time is required, when the activated carbon particles are reacted with chlorine in a fixed bed type reactor. Contrary to this, no further improved results are obtained in the case where the diameter of the activated carbon particles is made too large. Thus, the activated carbon particles above-mentioned range is suitable for use in used in the present invention.

In the case where carbon particles, other than activated carbon particles, such as molded graphite are used, not only the molded particles cannot be desirably impregated with an aqueous solution of at least one compound of said element selected from the group consisting of Groups III, IV and V of the Periodic Table of Elements, but also the reaction does not proceed smoothly. In addition, in the case where graphite powder is molded after adding the above-mentioned compound thereto, the yield of the desired chlorides is remakably low and a long reaction time is required. Thus, the object of the present invention cannot be performed.

Although there is no specific limitation in the specific surface area of the activated carbon particles used in the present invention, when the specific surface area is too small, the amount of the above-mentioned compounds supported on the activated carbon particles becomes undesirably small. Contrary to this, when the specific surface area is too large, the mechanical strength of the activated carbon particles undesirably degreases. Accordingly, the typical specific surface area of the activated carbon particles is generally from 400 to 6000 m²/g and, preferably, from 1000 to 4000 m²/g.

The impregnation of the above-mentioned compounds of elements of Groups III, IV and V of the Periodic Table into the activated carbon particles can be readily carried out in any conventional manner. Typical impregnation methods are:

(1) The activated carbon particles are dipped in aqueous solutions of said compounds;
(2) Aqueous solutions of said compounds are sprayed on the activated carbon particles; and
(3) Activated carbon powder is granulated by using a granulator, while aqueous solutions of said compounds are sprayed on the activated carbon.

When the activated carbon particles are subjected to a vacuum deaeration treatment prior to the impregnation, the impregnation time can be preferably shortened.

The amount of the above-mentioned compounds supported on the activated carbon particles can be varied or adjusted depending upon the concentration of the aqueous solution thereof, the specific surface area of the activated carbon particles, the impregnation period of time, the times of the impregnation operation and the like. However, it should be noted that the amount of the supported compounds is such that the amount of the carbon is not less than the stoichiometric amount necessary, as a reducing agent, to produce the desired chlorides. Generally speaking, the above-mentioned compounds may be supported on the activated carbon particles in an amount of from 10 to 80 parts by weight, preferably, from 20 to 60 parts by weight, based on 100 parts by weight of the activated carbon particles. In the case where the supported amount of said compounds is too small, the productivity becomes undesirably low. On the other hand, when the supported amount is too large, the mechanical strength of the activated carbon particles decreased and, therefore, the crushing or pulverizing of the activated carbon particles is liable to be caused due to the fact that the amount of the activated carbon consumed during the reaction becomes too large. Thus, the supported amount of activated carbon particles having the above-mentioned range is suitable for use in the present invention.

In the present invention, the activated carbon particles having an impregnated or supported aqueous solution of the above-mentioned compounds thereon should be heated at a temperature of from 300° to 1000° C., preferably from 300° to 800° C. and more preferably from 400° to 600° C. in an inert gas atmosphere (preferably, by passing an inert gas through the activated carbon particles to be heated). By this heat-treatment, (1) contamination of impurities into the desired chlorides which are formed in the subsequent chlorination step can be effectively prevented and (2) the decrease in the yield of the desired chlorides, due to the hydrolysis of the chlorides by the water absorbed by the activated carbon particles, can be effectively prevented. In the case where the heat-treatment temperature is too low, the prevention effects (1) and (2) set forth above cannot be sufficiently performed. On the other hand, when the heat-treatment temperature is too high, further improvement in the above-mentioned prevention effects cannot be obtained and it is not preferably from the economical point of view. Thus, the above-mentioned heat-treatment temperature range is suitable for use in the present invention. The heat-treatment period of time is generally from 1 to 20 hours, although it depends on the heating temperature, the amount of the activated carbon particles to be treated, the flow rate of the inert gas and the like. Typical examples of the inert gas used in the heat-treatment of the present invention are nitrogen, helium, argon and the like. In the case where the heat-treatment is carried out in the presence of oxygen-containing gas such as air, the activated carbon particles are undesirably burned. The heat-treatment of the activated carbon particles having a supported aqueous solution of the above-mentioned compounds thereon can be conducted in any time prior to the reaction thereof which chlorine.

For instance, when boric acid is used as the above-mentioned compound, the boric acid is decomposed by the heat-treatment to form diboron trioxide in the following equation (1).

$$2H_3BO_3 \rightarrow B_2O_3 + 3H_2O \tag{1}$$

The heat-treated activated carbon particles obtained above are then reacted with chlorine in the present invention. The reaction of the activated carbon particles with chlorine can be carried out in any manner so long as the activated carbon particles are thoroughly contacted with chorine. Generally, the reaction is carried out, while chlorine gas is allowed to pass through the activated carbon particle layer. Since a too low reaction temperature requires a long reaction time and also since a too high reaction temperature is not economical due to the fact that further improvements in the reaction cannot be obtained, the reaction is generally carried out at a temperature of from 300° to 1000° C., preferably from 300° to 800° C. and, more preferably, from 400° to 600° C. When the reaction is carried out at the above-mentioned temperature range, the reaction smoothly proceeds and the desired chlorides can be obtained in the form of gas. The reaction time can be generally from 1 to 5 hours, although it depends upon, for example, the reaction temperatrue and the feed amount of the chlorine gas.

For instance, when boric acid is used as the above-mentioned compound, the reaction of the activated carbon particles, on which diboron trioxide is supported after the above-mentioned heat-treatment, with chlorine proceeds as follows.

$$B_2O_3 + 3C + 3Cl_2 \rightarrow 3CO + 2BCl_3 \tag{2}$$

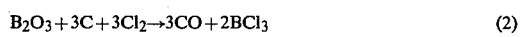

The desired chlorides can be readily recovered by any conventional manner, for example, condensation and distillation.

The present invention can be continuously or batchwise carried out by using, for example, a fixed bed, a moving bed or a fluidized bed type reactor, although the use of a fixed bed or a moving bed type reactor is preferable.

As mentioned hereinabove, according to the present invention, since aqueous solutions of compounds of elements of Group III, IV or V of the Periodic Table is supported on activated carbon particles, followed by reacting with chlorine after being subjected to a heat-treatment, the troublesome and inefficient mixing operation of powder as in the conventional processes can be obviated and the chlorine can readily pass through and be dispersed into the activated carbon particles having a supported aqueous solution of said compounds thereon. Therefore, the reaction can proceed at a relatively low temperature during a short time and the desired chlorides having a high purity can be readily produced at a high yield. Thus, the above-mentioned disadvantages of the prior arts can be effectively obviated.

The present invention now will be further illustrated by, but by no means limited to, the following Examples.

EXAMPLE 1

222 g of boric acid ($H_3BO_4$) was dissolved in 1100 ml of water at a temperature of 80° C. In the aqueous boric acid solution, 1 liter of activated carbon particles having a diameter of 3 mm and a specific surface area of 1150 $m^2/g$ was dipped for 5 minutes and, then, was filtered. The filtered activated carbon particles were dried at a temperature of 160° C. for 20 hours in an air atmosphere. The amount of $H_3BO_4$ supported on the activated carbon particles was 79.5 g.

The activated carbon particles thus obtained were packed in a reaction tube made of quartz and having an inner diameter of 50 mm and, then, were heated, while nitrogen gas was passed through the reaction tube at a flow rate of 3000 ml/min. Thus, the heating treatment of the activated carbon particles was carried out at a temperature of 500° C. for 3 hours to effect the decomposition and dehydration of the boric acid supported on the activated carbon particles.

Therefore, chlorine gas, instead of the nitrogen gas, was passed through the reaction tube at a flow rate of 900 ml/min for 1.5 hours to effect the reaction of the boric acid supported on the activated carbon particles with chlorine. The effluent gas mixture from the reaction tube was collected in the form of liquid by cooling the gas mixture with dry ice. The collected liquid contained 148 g boron trichloride and 13 g of chlorine. The conversion of the boric acid supported on the activated carbon particles (which are referred to as "conversion" hereinafter) was 100% and the yield of borom trichloride was 98%.

EXAMPLES 2 through 6

20 g (323 m mol) of boric acid ($H_3BO_3$) was dissolved in 100 ml of water at a temperature of 80° C. In the aqueous boric acid solution, 90 ml of the activated carbon particles as used in Example 1 was dipped for 5 minutes and, then, after filtering, the filtered activated carbon particles were dried at a temperature of 160° C. for 20 hours in a air atmosphere. Thus, the activated carbon particles having 8.0 g of the supported $H_3BO_4$ was obtained.

90 ml of the activated carbon particles having the supported boric acid thereon was packed in a reaction tube made of quartz and having an inner diameter of 24 mm and, then, was heated, while argon gas was passed through the reaction tube at a flow rate of 270 ml/min. After the activated carbon particles having the supported boric acid thereon were treated by heating at the temperature listed in Table 1 below for 1 hour, chlorine gas, instead of the argon gas, was passed through the reaction tube at a flow rate of 90 ml/min and at the same temperature as the above-mentioned heat treatment temperature listed in Table 1 below. Thus, the boric acid supported on the activated carbon particles was reacted with chlorine. The formed gas effluted from the reaction tube was absorbed into water. After adding 50 g of D-sorbitol to the absorbed water, the boron trichloride thus produced was quantitatively determined by the titration of 1 N aqueous sodium hydroxide solution.

The required reaction time for which the conversion of the boric acid became 100% is listed in Table 1 below. The amount of boron trichloride produced in each Example was 130 m mol (about 15 g).

TABLE 1

| Example No. | Heat treatment and reaction temp.(°C.) | Required Reaction Time (min) for which conversion becomes 100% |
|---|---|---|
| 2 | 800 | 75 |
| 3 | 700 | 80 |
| 4 | 600 | 90 |
| 5 | 500 | 95 |
| 6 | 400 | 125 |

EXAMPLE 7

Activated carbon particles having supported boric acid thereon were prepared and heat-treated in a manner as described in Example 5, except that the dipping time was changed from 5 minutes to 30 minutes. The amount of the supported boric acid was 11.7 g. Chlorine gas was passed through the reaction tube at a flow rate of 200 ml/min and a temperature of 500° C. The required reaction time for which the conversion of the supported boric acid became 100% was 45 minutes and 22 g (190 m mol) of boron trichloride was formed.

EXAMPLE 8

70 g of boric acid ($H_3BO_3$) was added to 200 ml of water and, then, heated to a temperature of 97° C. to dissolve the boric acid in the water. 90 ml of the activated carbon particles as used in Example 1 was dipped in this aqueous boric acid solution for 10 minutes. By using these activated carbon particles the heat treatment of the activated carbon particles and the subsequent reaction thereof with chlorine were carred out in a manner as described in Example 1. The required reaction time for which the conversion of the boric acid became 100% was 75 minutes and 35 g (300 m mol) of boron trichloride was formed.

COMPARATIVE EXAMPLE 1

8.5 g of diboron trioxide powder and 28 g of graphite powder having a powder size such that the powder could pass through a screen of 100 meshes were thoroughly mixed together and, then, molded under pressure to form cylindrical pellets having a diameter of 5 mm and a height of 6 mm. These pellets were packed in a reaction tube made of quartz having an inner diameter of 24 mm. Chlorine gas was passed through the reaction tube at a flow rate of 100 ml/min. Thus, the diboric trioxide was allowed to react with chlorine at a temperature of 800° C. The required reaction time for which the conversion of the diboron trioxide became 50% was 320 minutes.

COMPARATIVE EXAMPLE 2

The molded mixture of the diboron trioxide powder and the graphite powder was allowed to react with chlorine in a manner as described in Comparative Example 1, except that the reaction temperature with chlorine was changed to 600° C. However, after a 240 minute reaction, the conversion of the diboron trioxide was still only 2%.

COMPARATIVE EXAMPLE 3

The reaction of Example 1 was repeated, except that both the heat treatment temperature and the reaction temperature were changed to 200° C. However, after a 240 minute reaction the conversion of the boric acid was still only 10%.

COMPARATIVE EXAMPLE 4

8.5 g of diboron trioxide powder and 6.0 g of graphite powder having a powder size so that the powder could pass through a screen of 60 mesh were thoroughly mixed together and the mixture was placed in a flat-bottomed reactor made of quartz having an inner diameter of 40 mm. While argon gas was made to flow through at a flow rate of 200 ml/min, the mixture was heated at a temperature of 400° C. for 3 hours and, then, chlorine gas, instead of argon gas, was passed through at a flow rate of 100 ml/min to react with diboron trioxide at a temperature of 800° C. After a 3.5 hour reaction, the conversion of the diboric trioxide was still only 45%.

EXAMPLE 9

16.3 g of sodium tetraborite ($Na_2B_4O_7$) was added to 100 ml of water and heated to a temperature of 80° C. to dissolve the sodium tetraborate in the water. In this aqueous solution, 80 ml of activated carbon particles cylindrically shaped having a diameter of 3 mm and a height of 6 mm and having a specific surface area of 1150 $m^2/g$ was dipped for 5 minutes. After filtration, the filtered activated carbon particles were dried at a temperature of 200° C. for 20 hours. The amount of $Na_2B_4O_7$ supported on the activated carbon particles was 6.1 g.

The activated carbon particles having the supported $Na_2B_4O_7$ thereon were packed in a reaction tube made of quartz having an inner diameter of 24 mm and, then, heated from the outside of the reaction tube to a temperature of 500° C., while argon gas was passed through the reaction tube at a flow rate of 200 ml/min. After the activated carbon particles was heated at a temperature of 500° C. for 1 hour, chlorine gas, instead of the argon gas, was passed through the reaction tube at a flow rate of 110 ml/min and a temperature of 500° C. for 1.5 hours.

The effluent gas from the reaction tube was collected in a dryice-methanol trap and the collected mixture was distilled to obtain 8.5 g of boron trichloride. The yield of the boron trichloride was 60%.

EXAMPLE 10

38.5 g of sodium carbonate ($Na_2CO_3$) was added to 15.2 g of siliceous stone powder having a $SiO_2$ content of 95.7% by weight and having a powder size of less than 100 mesh and, then, the mixture was heated to be molten. Thereafter, the resultant sodium silicate was dissolved in water by adding 100 ml of water to the molten mixture. In this solution, 80 ml of the activated carbon particles as used in Example 9 was dipped for 5 minutes at a temperature of 80° C. and filtered and dried in a manner as described in Example 9.

The resultant activated carbon particles were heat-treated and reacted with chlorine in a manner as described in Example 9, except that the reaction temperature with chlorine was changed to 700° C. The amount of Si component supported on the activated carbon particles was 6.2 g in terms of $SiO_2$. The effluent gas from the reaction tube was collected and distilled in a manner as described in Example 9. Thus 5.1 g of silicon tetrachloride was obtained. The yield of the silicon tetrachloride was 28%.

EXAMPLE 11

The reaction of Example 9 was repeated, except that (i) 40.1 g of zirconium oxide nitrate [$ZrO(NO_3)_2.2H_2O$] was used, (ii) the flow rate of the chlorine gas was changed to 200 ml/min and (iii) the reaction temperature with chlorine was changed to 600° C. The amount of Zr component supported on the activated carbon particles was 15.5 g in terms of $ZrO(NO_3)_2$. The effluent gas from the reaction tube was cooled by ice and 11.1 g of zirconium tetrachloride was collected. The yield of the zirconium tetrachloride was 71%.

EXAMPLE 12

After 14.8 g of ammonium metavanadate ($NH_4VO_3$) was added to 100 ml of water, 20 g of oxalic acid was added thereto and the mixture was heated to a temperature of 80° C. to dissolve the ammonium metavanadate in the water. In this aqueous solution, 80 ml of the activated carbon particles as used in Example 9 was dipped for 5 minutes and, after filtering, the activated carbon particles were dried at a temperature of 200° C. for 20 hours. The amount of V component supported on the activated carbon particles was 7.0 g in terms of $NH_4VO_3$.

The activated carbon particles thus obtained was heat treated and reacted in a manner as described in Example 9. The effluent gas from the reaction tube was cooled by ice and the collected red-brown liquid was distilled. Thus, 6.1 g of vanadium tetrachloride was obtained. The yield of the vanadium tetrachloride was 52%.

EXAMPLE 13

The reaction of Example 12 was repeated, except that 15.0 g of sodium metavanadate ($NaVO_3$) was used instead of the ammonium metavanadate. Thus, 5.8 g of vanadium tetrachloride was obtained. The yield of the vanadium tetrachloride was 35%.

COMPARATIVE EXAMPLE 5

32.8 g of sodium tetraborate ($Na_2B_4O_7.10H_2O$) and 7.2 g of activated carbon powder having a powder size of less than 100 mesh were thoroughly mixed together and molded under pressure to form cylindrical pellets having a diameter of 10 mm and a height of 8 mm. These pellets were heated and reacted with chlorine in a manner as described in Example 9. Thus, 2.9 g of boron trichloride was obtained. The yield of the boron trichloride was 29%, which was far less than the yield of Example 9 (i.e. 60%).

COMPARATIVE EXAMPLE 6

6.4 g of the silica powder as used in Example 10, 6.0 g of activated carbon powder having a powder size of less than 100 meshes and 3.0 g of silica sol having a $SiO_2$ content of 30% by weight were thoroughly mixed with each other and, then, molded under pressure to form cylindrical pellets having a diameter of 10 mm and a height of 10 mm. The pellets were heated and reacted with chlorine in a manner as described in Example 10.

The effluent gas from the reaction tube was collected. However, since the amount of the collected product was only a trace amount, hydrogen fluoride and potassium chloride were added to the collected product to convert the Si component in the collected product to potassium silicofluoride. Thereafter, the potassium silicofluoride was quantitatively determined by an alkali titaration. Thus, the yield of the silicon tetrachloride which was converted from the quantitative analysis of the potassium silicofluoride was only 3%.

COMPARATIVE EXAMPLE 7

7.0 g of vanadium pentoxide powder having a powder size of less than 100 meshes and 8.3 g of activated carbon powder having a powder size of less than 100 meshes were thoroughly mixed together and molded under pressure to form cylindrical pellets having a diameter of 10 mm and a height of 8 mm. The pellets thus obtained were then subjected to heat treatment and reacted with chlorine in a manner as described in Example 9.

The effluent gas from the reaction tube was cooled with ice and the collected reaction product was distilled in a manner as described in Example 12. Thus 3.1 g of vanadium tetrachloride was obtained. The yield of the vanadium tetrachloride was 21%.

We claim:

1. A process for producing the chloride of an element selected from the group consisting of boron, silicon, zirconium and vanadium comprising the steps of:
   (i) impregnating activated carbon particles with an aqueous solution of at least one compound, other than the chloride, of said element;
   (ii) heating the activated carbon particles having a supported aqueous solution of said compound thereon at a temperature of 300° through 1000° C. in an inert gas atmosphere; and,
   (iii) reacting the resultant activated carbon particles with chlorine.

2. A process as claimed in claim 1, wherein the activated carbon particles having the supported aqueous solution thereon are heated at a temperature of from 300° through 800° C.

3. A process as claimed in claim 2, wherein the heating temperature is from 400° through 600° C.

4. A process as claimed in claim 1, wherein the reaction of the resultant activated carbon particles with chlorine is carried out at a temperature of from 300° through 1000° C.

5. A process as claimed in claim 4, wherein the reaction temperature is from 300° through 800° C.

6. A process as claimed in claim 5, wherein the reaction temperature is from 400° through 600° C.

7. A process as claimed in claim 1, wherein said compound of the element is at least one compound selected from the group consisting of those which are soluble in water, an aqueous acid solution or an aqueous alkaline solution.

8. A process as claimed in claim 7, wherein said compound is selected from the group consisting of boric acid, sodium tetraborate, sodium silicate, zirconium oxide nitrate, ammonium metavanadate and sodium vanadate.

9. A process as claimed in claim 1, wherein said activated carbon particles have a diameter of from 1 through 50 mm.

10. A process as claimed in claim 9, wherein said diameter of the particles is from 3 through 15 mm.

11. A process as claimed in claim 1, wherein said activated carbon particles have a specific surface area of from 400 to 6000 m$^2$/g.

12. A process as claimed in claim 11, wherein said specific surface area is from 1000 to 4000 m$^2$/g.

13. A process as claimed in claim 1, wherein the amount of said compound supported on the activated carbon particles is from 10 to 80 parts by weight, based on 100 parts by weight of the activated carbon particles.

14. A process as claimed in claim 13, wherein the amount of said compound is from 20 to 60 parts by weight, based on 100 parts by weight of the activated carbon particles.

15. A process as claimed in claim 1, wherein said inert gas is selected from the group consisting of nitrogen, helium and argon.

16. A process for producing the chloride of an element selected from the group consisting of boron, silicon, zirconium and vanadium comprising the steps of:
   (i) impregnating activated carbon particles with an aqueous solution of at least one compound, other than the chloride, of said element;
   (ii) heating the activated carbon particles having a supported aqueous solution of said compound thereon at a temperature of 300° through 800° C. in an inert gas atmosphere selected from the group consisting of nitrogen, helium and argon; and,
   (iii) reacting the resultant activated carbon particles with chlorine at a temperature of 300° through 800° C.

17. A process as claimed in claim 16, wherein said element is boron.

18. A process as claimed in claim 16, wherein said element is silicon.

* * * * *